(No Model.)
T. MIDGLEY.
MANUFACTURE OF WIRE BELTING.
No. 386,336. Patented July 17, 1888.
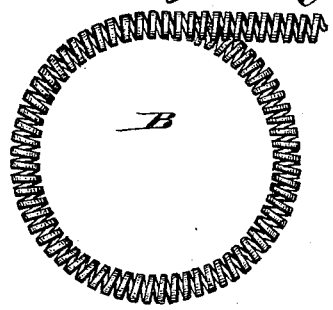
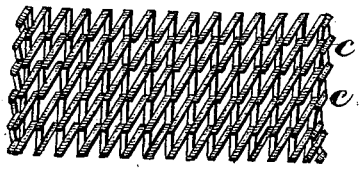
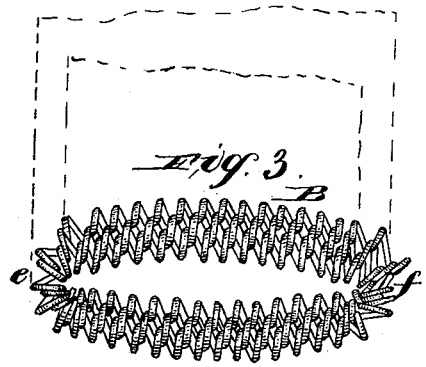
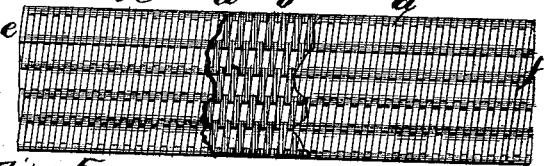
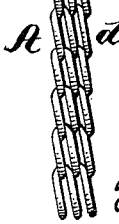
Witnesses:
And. H. Scott
Wm. E. Dyre
Inventor
Thomas Midgley.
By Johnston, Reincoil & Dyre,
his Attorneys.

UNITED STATES PATENT OFFICE.

THOMAS MIDGLEY, OF BEAVER FALLS, PENNSYLVANIA, ASSIGNOR OF ONE-HALF TO JAMES E. EMERSON, OF SAME PLACE.

MANUFACTURE OF WIRE BELTING.

SPECIFICATION forming part of Letters Patent No. 386,336, dated July 17, 1888.

Original application filed February 13, 1888, Serial No. 263,901. Divided and this application filed March 1, 1888. Serial No. 265,836. (No model.)

*To all whom it may concern:*

Be it known that I, THOMAS MIDGLEY, a citizen of the United States, residing at Beaver Falls, in the county of Beaver and State of Pennsylvania, have invented certain new and useful Improvements in Methods of Manufacturing Wire Belting; and I do hereby declare the following to be a full, clear, and exact description of the invention, such as will enable others skilled in the art to which it appertains to make and use the same.

My invention relates to a method of manufacturing wire belting, and has for its object an improvement in the belting shown in Patents Nos. 362,576 and 362,577, of May 10, and No. 371,181, of October 11, 1887, granted to James E. Emerson and myself.

The invention will be hereinafter described, and particularly pointed out in the claim.

In the accompanying drawings, which form a part of this specification, Figure 1 represents an end view of a tube of coiled intersected wires. Fig. 2 is a plan of the same. Fig. 3 is a perspective view of the tube partly compressed to feed it between a pair of rolls. Fig. 4 is a plan of the belting after it has been rolled, and Fig. 5 is an edge view.

Reference being had to the drawings and the letters marked thereon, A represents the body of the belt, which is made of two thicknesses or layers, *a b*, of woven wire, which are formed by interwoven coiled sections *c*.

In manufacturing belting of my improved construction sections of coiled wire of a suitable length are interwoven by twisting or screwing one section into another and forming a tube, B, as shown in Fig. 1. In screwing or interweaving the coiled sections they are made to terminate in a line along the length of the tube, to make the joints overlap and prevent the belting made from the tube having any point in it which shall be weakened sufficiently to impair its strength. The sections *c* are usually of a length equal to about four times the circumference of the tube, and when one section has been screwed into the tube until its free end has been reached another section is applied and interwoven in like manner until a tube of any desired length corresponding with the length of belt required has been woven.

It will be observed that the sections are interwoven at a right angle to the length of the tube, as shown in Fig. 1. After the tube has been completed, it is compressed horizontally and passed between a pair of rolls, the pressure of which elongates and flattens the links, as shown at *d* in Figs. 4 and 5, and forms belting of two separate layers or thicknesses, *a b*, and the edges *e f* are formed by doubling the two surfaces of the body at the points in the circumference of the tube which constitute the edges of the belting when rolled out and flattened. By this construction no ragged ends or strands of wire appear on the edges of the belting, while they are formed of a double thickness of longitudinal surfaces of links, as shown in Fig. 5.

In passing the tube through between the rolls it is folded so as to bring the joints or broken ends of the coiled sections in about the center of one of the flat bearing-surfaces *a b* of the belting, to prevent any ragged ends from protruding on either edge, and is kept under tension. The tube or belting is prevented from spreading while being rolled by placing solid bars of metal of slightly less thickness than the rolled belting between the rolls while the tube or belting is passing through. The bars are set such a distance apart as to allow the tube to fold or double, but to prevent the coils or helices from spreading laterally.

By doubling the body of the belting not only are superior working-edges formed, but the belting may be made of much lighter wire than when only one thickness is used, thus greatly increasing its strength without correspondingly increasing its weight.

To provide still greater strength, the sections of coiled wire may be increased to any desired number, thus making each thickness or layer *a b* consist of two or more intersected coiled sections, *c*, one on top of the other. After the belting has been rolled, it is tempered, and may then, if desired, be coated or covered with rubber or other plastic material and the rubber rolled into the interstices between the links and canvas or rubber cloth applied to the rubber-coated surfaces; or the surfaces may be covered with canvas previously treated with a paint which becomes adhesive under heat.

The belting produced by my method of manufacture is claimed in my application, Serial No. 263,901, filed February 13, 1888, of which this application is a division.

Having thus fully described my invention, what I claim is—

The method of manufacturing belting herein described, which consists in weaving sections of coiled wire into a tube, then compressing the tube and passing it between rolls, whereby a double thickness of belting is formed, and the helices flattened and stretched into elongated links.

In testimony whereof I affix my signature in presence of two witnesses.

THOS. MIDGLEY.

Witnesses:
J. F. MERRIMAN,
T. R. HENNON.